United States Patent [19]
Kishida et al.

[11] 3,853,952
[45] Dec. 10, 1974

[54] 2-ETHYNYLCYCLOPROPANE COMPOUNDS AND PROCESS FOR THE PREPARATION THEREOF

[75] Inventors: Yukichi Kishida; Masafumi Yoshimoto; Noboru Ishida, all of Tokyo, Japan

[73] Assignee: Sankyo Company Limited, Tokyo, Japan

[22] Filed: June 23, 1971

[21] Appl. No.: 156,049

[30] Foreign Application Priority Data
June 29, 1970 Japan.................. 45-56798

[52] U.S. Cl.............. 260/469, 71/106, 71/111, 71/112, 71/113, 71/115, 260/448 R, 260/468 P, 260/473 R, 260/475 SC, 260/471 R, 260/514 P, 260/515 R, 260/515 A, 260/515 P, 260/520, 424/305, 424/306, 424/308, 424/309, 424/317
[51] Int. Cl............................................. C07c 69/76
[58] Field of Search............ 260/520, 515 R, 515 A, 260/473 R, 469, 468 H, 514 H, 475 SC

[56] References Cited
UNITED STATES PATENTS
3,397,223  8/1968  Payne ................................. 260/464
3,445,499  5/1969  Martel et al. ....................... 260/464

OTHER PUBLICATIONS
D'Yakonov et al., Chem. Abstracts, vol. 58 (1963), page 6703d.

Primary Examiner—James A. Patten
Attorney, Agent, or Firm—Flynn & Frishauf

[57] ABSTRACT

Novel 2-ethynylcyclopropane compounds having the formula

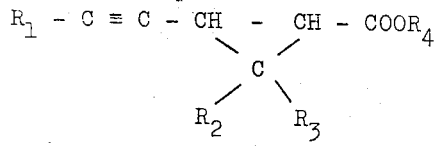

wherein $R_1$ represents hydrogen atom, a straight or branched lower alkyl group or an aryl group which may be substituted with trifluoromethyl, nitro, halogen, a lower alkyl or a lower alkoxy, $R_2$ and $R_3$ may be the same or different and each represents hydrogen atom, a straight or branched lower alkyl group, a substituted or unsubstituted aryl group or an alkoxycarbonyl group and $R_4$ represents hydrogen atom or a hydrocarbon group such as alkyl, aryl and aralkyl and the salt thereof.

12 Claims, No Drawings

2-ETHYNYLCYCLOPROPANE COMPOUNDS AND PROCESS FOR THE PREPARATION THEREOF

The products have pharmacological and agricultural properties and are useful as anti-inflammatory agents and herbicides or insecticides.

The products are prepared by reacting a propargyl sulfonium salt having the formula

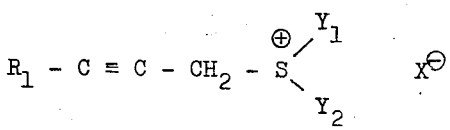

wherein $R_1$ is the same as above, $Y_1$ and $Y_2$ may be the same or different and each represents a straight or branched lower alkyl group or $Y_1$ and $Y_2$ taken together with the sulfur atom to which they are attached may form a saturated heterocyclic ring and $X^-$ represents an anion with an acrylic acid derivative having the formula

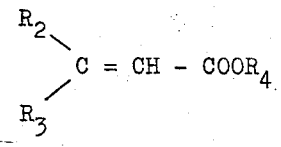

wherein $R_2$, $R_3$ and $R_4$ are the same as above in the presence of a base suh as an alkali metal hydride.

This invention relates to novel 2-ethynylcyclopropane compounds and a process for the preparation thereof.

More particularly, it relates to 2-ethynylcyclopropane compounds having the formula

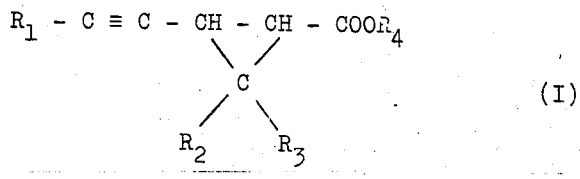

wherein $R_1$ represents hydrogen atom, a straight or branched lower alkyl group or an aryl group which may be substituted with trifluoromethyl, nitro, halogen, a lower alkyl or a lower alkoxy, $R_2$ and $R_3$ may be the same or different and each represents hydrogen atom, a straight or branched lower alkyl group, a substituted or unsubstituted aryl group or an alkoxycarbonyl group and $R_4$ represents hydrogen atom or a hydrocarbon group such as alkyl, aryl and aralkyl and the salt thereof.

The term lower alkyl is intended to represent an alkyl group having from 1 to 5 carbon atoms.

It also relates to a process for the preparation of the 2-ethynylcyclopropane compounds having the formula (I).

All of the 2-ethynylcyclopropane compounds of this invention are novel compounds unknown in the prior art. We have unexpectedly found that they have a remarkable insecticidal and herbicidal activities. Especially they exhibit a potent insecticidal activity for mosquito (*Culex pipiens molestus*) and have a herbicidal effect in dry field forming, for example, a tomato farm.

Furthermore they exhibit an anti-inflammatory activity and a blood sugar lowering activity and are useful as medicaments.

It is thus an object of the present invention to provide a new class of chemical compounds.

It is another object of this invention to provide new insecticidal or herbicidal compositions and new anti-inflammatory or blood sugar lowering compositions. It is a further object of the present invention to provide a process for the preparation of chemical compounds which are useful in medicinal or agricultural area.

The compounds having the formula (I) in which $R_4$ represents hydrogen atom are in a free carboxylic acid form and may be administered in their free form or in the form of their alkali or alkaline earth metal salts such as sodium, potassium, calcium and aluminum salt.

The compounds of this invention may be compounded and formulated into pharmaceutical preparations in unit dosage form for oral or parenteral administration with organic or inorganic solid materials or liquids which are pharmaceutically acceptable carriers.

The composition may take the form of tablets, powders, granules, capsules, suspensions, solutions and the like. Although the optimum quantities of these compounds to be used in such manner will depend on the particular compound employed and disease conditions and ages of a patient, the oral total daily dosage for adults is of about 50 – 1,000 mg. preferably in multiple doses such as three or more times a day.

According to the present invention, the 2-ethynylcyclopropane compounds (I) are prepared by reacting a propargyl sulfonium salt having the formula

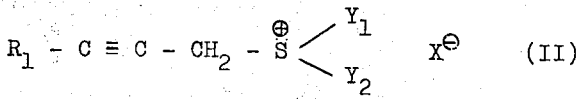

wherein $R_1$ is the same as above, $Y_1$ and $Y_2$ may be the same or different and each represents a straight or branched lower alkyl group or $Y_1$ and $Y_2$ taken together with the sulfur atom to which they are attached may form a saturated heterocyclic ring such as tetrahydrothiophene and tetrahydrothiopyran and $X^-$ represents an anion such as a halide ion and sulfate ion with an acrylic acid derivative having the formula

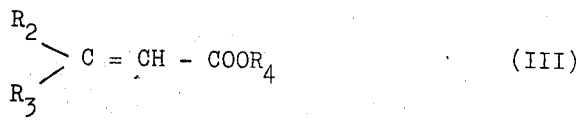

wherein $R_2$, $R_3$ and $R_4$ are the same as above in the presence of a base.

In carrying out the present invention, the compounds (II) are contacted with the compounds (III) in the presence of a base preferably using a solvent. As a solvent, there may be employed an inert organic solvent without limitation that would not adversely affect the reaction. Examples of such a solvent include hydrocarbons such as benzene and toluene; ethers such as dioxane, tetrahydrofuran and diethyl ether; and dimethyl sulfoxide. There may be usually employed ether or dimethyl sulfoxide which has a high solubility of the reactants. As the base employed as a catalyst in the reaction, there may be used any base without limitation that would be generally used in forming carbanion. Examples of such a base include an alkali metal hydride such as sodium hydride, potassium hydride; an alkali metal alkoxide such as potassium tertiary butoxide; an alkali metal amide such as sodium amide; and a quaternary ammonium base such as Triton B. Most preferable bases are an alkali metal hydride and an alkali metal tertiary alkoxide.

The reaction temperature is not critical but the reaction is desirably carried out at relatively lower temperature to prevent a side reaction and increase a yield of the desired product. Usually the reaction is carried out under cooling below 10°C. The reaction period is varied mainly depending upon the reaction temperature and a kind of the reactant and the base, but usually about from one hour to about 20 hours. The reaction is preferably carried out in an inert gas atmosphere such as a nitrogen or argon gas atmosphere to prevent an oxidation reaction by oxygen in the air.

After completion of the reaction, the desired product (I) is separated from the reaction mixture by a conventional means. For instance, after completion of the reaction, the reaction mixture is poured into ice water and the mixture is extracted with a suitable solvent such as ethyl acetate.

The extract is washed with saturated aqueous sodium chloride and dried with a drying agent such as anhydrous sodium sulfate and the solvent is distilled off to give the desired product. The desired product is, if necessary, further purified by distillation or chromatography.

In the present invention, there is formed a mixture of cis and trans forms of the desired product regarding the ethynyl group and the carboxyl group attached to the cyclopropane ring.

However only a small amount of the cis form is formed and, therefore, all of the products purified by a conventional means and trans form.

The carboxylic acid compounds having the formula (I) in which $R_4$ represents hydrogen atom are alternatively prepared by hydrolyzing the compound having the formula (I) in which $R_4$ represents a hydrocarbon group with an alkali or alkaline earth metal hydroxide such as sodium hydroxide and potassium hydroxide. The free carboxylic acid compound may be, if necessary, converted to alkali or alkaline earth metal salt by a conventional means. For example, the free carboxylic acid compounds are reacted with an alkali or alkaline earth metal alkoxide in alcohol to give the alkali or alkaline earth metal salts.

The propargyl sulfonium salt (II) is a novel compound and prepared by halogenating a propargyl alcohol having the formula

wherein $R_1$ is the same as above with a phosphorus halogenide, e.g., phosphorus trichloride, phosphorus tribromide, phosphorus pentachloride and phosphorus pentabromide to give a propargyl halogenide having the formula

wherein $R_1$ is the same as above and $X_1$ represents a halogen atom and reacting the latter compound with a sulfide having the formula

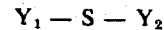

wherein $Y_1$ and $Y_2$ are the same as above in a suitable solvent, e.g., benzene.

The above mentioned propargyl alcohol and a process for the preparation thereof are disclosed in Chem. Ber. 97, 2118 (1964) and U.S. Pat. No. 3,332,988.

PREPARATION OF THE PROPARGYL SULFONIUM SALT (II)

[I] Preparation of o-methylphenylpropargyltetrahydrothiophenium bromide

1. To a mixture of 31.2 g. of o-methylphenyl propargyl alcohol, 7.5 ml. of pyridine and 150 ml. of anhydrous ether is added dropwise 53.6 g. of phosphorus tribromide over 30 minutes while maintaining the temperature between 0°–10°C. The reaction mixture is stirred at 20°C. for 5 hours and poured into ice water. The mixture is extracted with ether and the extract is washed with aqueous sodium chloride, sodium bicarbonate and aqueous sodium chloride, successively and dried over anhydrous sodium sulfate. The solvent is distilled off and the residue is subjected to distillation to give 26.8 g. of o-methylphenylpropargyl bromide boiling at 95°–97°C. under 0.3 mm. pressure of mercury. The yield is 60.1 percent.

2. 26 g. of o-methylphenylpropargyl bromide is admixed with 45 g. of tetrahydrothiophene in 100 ml. of benzene. The mixture is allowed to stand at room temperature for 15 hours. Precipitates thus formed are separated by filtration and washed with benzene and ether successively to give 30.6 g. of o-methylphenylpropargyltetrahydrothiophenium bromide. The product is further purified by recrystallization from a mixture of ethanol and acetone to give pure crystals melting at 108°C. The yield is 47.8 percent.

[II] According to the same procedure as mentioned above, there may be obtained the following propargyl sulfonium salts:

phenylpropargyltetrahydrothiophenium bromide (m.p.128°C.), o-chlorophenylpropargyltetrahydrothiophenium bromide (m.p. 122°–124°C.), o-methoxyphenylpropargyltetrahydrothiophenium bromide (m.p. 103°–105°C.), m-methylphenylpropargyltetrahydrothiophenium bromide (m.p. 91°C.), m-trifluoromethylphenylpropargyltetrahydrothiophenium bromide (m.p. 112°C.), m-chlorophenylpropargyltetrahydrothiophenium bromide (m.p.115°C.), m-bromophenylpropargyltetrahydrothiophenium bromide (m.p. 115°–117°C.), m-methoxyphenylpropargyltetrahydrothiophenium bromide (m.p. 114°–115°C.), p-methylphenylpropargyltetrahydrothiophenium bromide (m.p. 112°C.), p-trifluoromethylphenylpropargyltetrahydrothiophenium bromide (m.p. 111°–112°C.), p-fluorophenylpropargyltetrahydrothiophenium bromide (m.p. 103°C.), p-chlorophenylpropargyltetrahydrothiophenium bromide (m.p. 127°C.), p-bromophenylpropargyltetrahydrothiophenium bromide (m.p. 131°C.) and p-methoxyphenylpropargyltetrahydrothiophenium bromide (m.p. 82°C.).

The following examples are presented to further illustrate the present invention.

EXAMPLE 1

2-Phenylethynyl-1-methoxycarbonylcyclopropane

1. In 50 ml. of tetrahydrofuran are dissolved 2.83 g. of 3-phenyl-2-propynyltetrahydrothiophenium bromide and 1.72 g. of methyl acrylate and the solution is cooled to 0° – 5°C. To the solution is added 0.48 g. of 50 percent sodium hydride containing mineral oil with stirring while introducing argon gas. The reaction mixture is stirred at that temperature for 30 minutes and further at room temperature for 1 hour. The reaction mixture is poured into 500 ml. of ice water and the mixture is extracted with ethyl acetate. The extract is washed with saturated aqueous sodium chloride and dried over anhydrous sodium sulfate and the solvent is distilled off. The residue is dissolved in acetone and to the solution is added 20 g. of silica gel. The solvent is uniformly evaporated to dryness with a rotary evaporator. The residue is put on 300 g. of silica gel charged into a chromatography nylon tube of 5 cm. diameter and developed with benzene. When the solvent reaches the bottom of the tube, the development is stopped. The tube is divided into 10 parts and the silica gel of each part is extracted with ethyl acetate. It is confirmed with thin-layer chromatography that the desired product exists in the middle portion of the tube. The solvent is distilled off from the extract of said part and the residue is subjected to reduced pressure distillation. The desired product is distilled at 108°– 110°C. under 0.3 mm. pressure of mercury. The yield is 1.0 g.

2. Following the procedure of the above (1), but replacing the 3-phenyl-2-propynyltetrahydrothiophenium bromide with 2.97 g. of 3-phenyl-2-propynyltetrahydrothiopyranium bromide, there is obtained the desired product.

3. Following the procedure of the above (1), but replacing the 3-phenyl-2-propynyltetrahydrothiophenium bromide with 2.90 g. of dimethyl-3-phenyl-2-propynylsulfonium bromide, there is obtained the desired product.

4. In 80 ml. of dimethyl sulfoxide is dissolved potassium tertiary butoxide obtained from 1.76 g. of metallic potassium and tertiary butanol and the solution is cooled to 0°– 5°C. and stirred vigorously while introducing argon gas. To the resulting mixture is added dropwise a solution of 8.5 g. of 3-phenyl-2-propynyltetrahydrothiophenium bromide and 5.2 g. of methyl acrylate in 40 ml. of dimethyl sulfoxide. The reaction mixture is stirred at 0° – 5°C. for 30 minutes, allowed to stand overnight and poured into 1 l. of ice water. The resulting mixture is extracted with ethyl acetate and the extract is treated with the same procedure as in the above (1) provided that silica gel is used in an amount of three times of the above (1) to give 2.8 g. of the desired product.

EXAMPLE 2

2-p-Bromophenylethynyl-1-methoxycarbonylcyclopropane

Following the procedure of Example 1-(1), but replacing the 3 -phenyl-2-propynyltetrahydrothiophenium bromide with 3.62 g. of 3-p-bromophenylethynyltetrahydrothiophenium bromide and replacing the distillation of the crude product with recrystallization from methanol, there is obtained 1.6 g. of the desired product melting at 57° – 59°C.

Analysis:

Calculated for $C_{13}H_{12}O_2$ : C,77.95; H,6.04

Found : C,77.44; H,6.16.

Mass Spectrum Analysis $(M^+)$ : 200.

IR (liquid film) $\nu$ cm$^{-1}$ : 2235 (c≡c), 1734 (ester C=O).

NMR $\delta$ ppm $(CDCl_3)$ : 1.90 – 2.20 (2H, multiplet,  )

1.1 – 1.6 (2H, multiplet,  )

3.72 (3H, singlet, -COOCH$_3$), 7.1 (5H, multiplet, 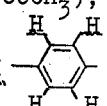 ).

Analysis:

Calculated for $C_{13}H_{11}O_2Br$ : C,55.93; H,3.97; Br,28.63

Found : C,55.99; H,3.94; Br,28.34.

IR (Nujol) $\nu$ cm$^{-1}$ : 2250 (c≡c), 1737 (ester c=o).

N.M.R. δ ppm (CDCl₃) : 2.0 (2H, multiplet, ≡C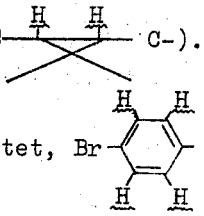C-).

7.18, 7.45 (4H, AB quartet, Br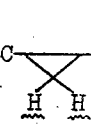).

1.35 (2H, multiplet, ≡C−△−CO−)

3.73 (3H, singlet, −COOCH₃)

EXAMPLE 3

3-Methyl-2-phenylethynyl-1-methoxycarbonylcyclopropane

Following the procedure of Example 1-(1), but replacing the method acrylate with 2.0 g. of methyl crotonate, there is obtained the desired product boiling at 110°C. under 0.3 mm pressure of mercury.

Analysis:

Calculated for C₁₄H₁₄O₂ : C,78.48; H,6.59

Found : C,78.25; H,6.24.

IR (liquid film) ν cm⁻¹ : 2240 (c≡c), 1735 (ester c=o).

N.M.R. δ ppm (CDCl₃) : 2.2 (1H, multiplet, ≡ C −△− CO −), 1.7 (1H, multiplet, ≡ C −△− CO −), 7.3 (5H, multiplet, phenyl), 1.30 (3H, doublet J=4.6 ≡ C 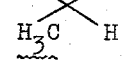 CO −), 1.2 (1H, multiplet, ≡ C 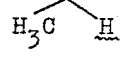 CO −), 3.70 (3H, singlet, − COOCH₃).

EXAMPLE 4

2-(1-Propynyl)-1-methoxycarbonylcyclopropane

In 250 ml. of tetrahydrofuran are dissolved 11.1 g. of 2-butynyltetrahydrothiophenium bromide and 8.61 g. of methyl acrylate and the solution is cooled to 0° − 5°C. To the solution is added 2.40 g. of 50 percent sodium hydride containing mineral oil with stirring while introducing nitrogen gas. The reaction mixture is stirred at that temperature for 30 minutes and further at room temperature for 2 hours. It is shaken together with an equivalent volume of ethyl acetate and saturated aqueous sodium chloride. The organic layer is separated and washed with saturated aqueous sodium chloride and dried over anhydrous sodium sulfate and the solvent is distilled off. The residue is subjected to reduced pressure distillation to give 4.0 g. of the desired product boiling at 108° − 110°C. under 50 mm. pressure of mercury.

Analysis:

Calculated for C₈H₁₀O₂: C,69.54; H,7.30

Found : C,70.01; H,7.68.

Mass Spectrum Analysis (M⁺) : 138.

IR (liquid film) ν cm⁻¹ : 1735 (ester C=O).

N.M.R. δ ppm (CDCl₃) : 1.6 - 2.1 (2H, multiplet, ≡C—CH—CH—CO-) 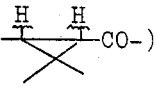

1.75 (3H, doublet, J=1.0, CH₃-C≡C—) 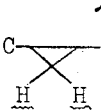

0.9 - 1.6 (2H, multiplet, ≡C—CO -) 

3.68 (3H, singlet, - COOCH₃)

EXAMPLE 5

2-(1-Propynyl)-1-methoxycarbonyl-3-methylcyclopropane

1. Following the procedure of Example 4, but replacing the methyl acrylate with 10.0 g. of methyl crotonate, there is obtained 2.5 g. of the desired product boiling at 106° - 108°C. under 20 mm. pressure of mercury.

Analysis:

Calculated for C₉H₁₂O₂: C,71.11; H,7.96

Found : C,72.10; H,8.29.

Mass Spectrum Analysis (M⁺) : 152.

IR (liquid film) νcm⁻¹ : 1732 (ester C=O)

N.M.R. δ ppm (CDCl₃) : 1.4 - 2.20 (2H, multiplet, ≡C—CO) 

1.78 (3H, doublet, J=1.0, CH₃ - C ≡ C—) 

1.21 (3H, doublet, J = 4.6, ≡C—CO ) 

1.0 - 1.5 (1H, multiplet, ≡C—CO ) 

3.67 (3H, singlet, -COOCH₃)

2. Following the procedure of the above (1), but reacting at 16° -0 18°C, there is obtained 3.16 g. of the desired product.

EXAMPLE 6

2-Ethynyl-1-methoxycarbonylcyclopropane

The reaction is carried out following the procedure of Example 4. but replacing the 2-butynyltetrahydrothiophenium bromide with 10.3 g. of 2-propynyltetrahydrothiophenium bromide. To the reaction mixture is added an equivalent volume of ethyl acetate and saturated aqueous sodium chloride and the mixture is shaken. The organic layer is separated and dried over anhydrous sodium sulfate and the solvent is distilled off. The residue is dissolved in acetone and to the solution is added 80 g. of silica gel. The solvent is uniformly evaporated to dryness with a rotary evaporater. The residue is put on 500g. of silica gel charged into a chromatography nylon tube of 5 cm diameter and developed with benzene.

When the solvent reaches the bottom of the tube, the development is stopped. The tube is divided and treated with the same manner as in Example 1-(1) to give the desired product as oil.

Analysis:

Calculated for C₇H₈O₂: C,67.73; H,6.50.

Found : C,67.62; H,6.41.

IR. (liquid film) νcm⁻¹:

2100 (C≡C), 1735 (ester C=O)

N.M.R. δ ppm (CD Cl₃):

1.6 - 2.1 (2H, multiplet, ≡C−CH−CH−CO ).

1.89 (1H, doublet, H−C≡C− ).

1.0 - 1.6 (2H, multiplet, =C−CH−CH−CO ).

3.72 (3H, singlet, −COOCH₃).

EXAMPLE 7

2-Phenylethynyl-1-ethoxycarbonylcyclopropane.

Following the procedure of Example 1-(1), but replacing the methyl acrylate with ethyl acrylate, there is obtained 1.1 g. of the desired product as oil.

Analysis:
 Calculated for C₁₄H₁₄O₂ : C,78.48; H,6.59.
 Found : C,78.23; H,6.48.
 Mass Spectrum Analysis (M⁺) :214.
 I.R. (liquid film)γcm⁻¹:
  2240 (C≡C), 1732 (ester C=O).

EXAMPLE 8

2-Phenylethynyl-1-carboxycyclopropane

The reaction is carried out following the procedure of Example 1-(1), but replacing the methyl acrylate and the 0.48 g. of 50 percent sodium hydride with 1.44 g. of acrylic acid and 1.44 g. of 50 percent sodium hydride, respectively. The reaction mixture is poured into ice water and the mixture is made acidic by addition of hydrochloric acid and extracted with ethyl acetate. After the extract is dried over anhydrous sodium sulfate, the solvent is distilled off. The crystalline residue is recrystallized from n-heptane to give 1 g. of the desired product melting at 89° - 90°C.

Analysis:

Calculated for C₁₂H₁₀O₂: C,77.40; H,5.41

Found : C,77.62; H,5.51.

IR (Nujol) ν cm⁻¹: 2230 (C≡C), 1690 (C=O), 2550 - 2800 (OH).

N.M.R. δ ppm (CDCl₃): 1.85 - 2.25 (2H, multiplet, ≡C−CH−CH−CO−)

7.3 (5H, multiplet, phenyl ).

1.2 - 1.7 (2H, multiplet, ≡C−CH−CH−CO), 12.0 (1H, singlet, −COOH).

EXAMPLE 9

2-p-Bromophenylethynyl-1-carboxycyclopropane

The reaction is carried out following the procedure of Example 1-(1), but replacing the 3-phenyl-2-propynyltetrahydrothiophenium bromide, the methyl acrylate and the 0.48 g. of 50 percent sodium hydride with 3.62 of 3-bomophenyl-2-propynyltetrahydrothiophenium bromide, 1.44 g. of acrylic acid and 1.44 g. of 50 percent sodium hydride, respectively, and the reaction mixture is treated with the same procedure as in Example 8 to give 1.6 g. of the desired product melting at 122° - 124°C.

Analysis:
 Calculated for C₁₂H₉O₂BR : C,54.36; H,3.48; Br,30.61.
 Found : C,54.35; H,3.07; Br,29.98.
 IR (Nujol)γcm⁻¹: 2230 (C≡C), 1710 (C=O), 2550 - 2780 (OH).

EXAMPLE 10

2-(1-Propynyl)-1-carboxycyclopropane

The reaction is carried out following the procedure of Example 4, but replacing the methyl acrylate and the 2.40 g. of 50 percent sodium hydride with 7.2 g. of acrylic acid, and 7.20 g. of 50 percent sodium hydride respectively, and the reaction mixture is treated with the same procedure as in Example 8 to give 2.5 g. of the desired product melting at 87°- 88°C.

Analysis:

Calculated for $C_7H_8O_2$: C,67.73; H,6.50

Found : C,67.84; H,6.56.

IR (Nujol) $\nu$ cm$^{-1}$ : 1720 (C=O), 2550 - 2800 (OH).

N.M.R. $\delta$ ppm (CDCl$_3$) 1.6 - 2.1 (2H, multiplet, ≡C-CH-CH-CO-), 1.74 (3H, doublet, J =1.0, $\underline{CH_3}$-C≡C-), 1.0 - 1.6 (2H, multiplet, ≡C-CH-CH-CO-), 11.5 (1H, singlet, -COO$\underline{H}$).

EXAMPLE 11

3-Methyl-2-(1-propynyl)-1-carboxycyclopropane

The reaction is carried out following the procedure of Example 4, but replacing the methyl acrylate and the 2.40 g. of 50 percent sodium hydride with 8.6 g. of crotic acid and 7.20 g. of 50 percent sodium hydride, respectively, and the reaction procedure as in Example 8 to give 3.1 g. of the desired product melting at 54° - 56°C. The product may be purified by reduced pressure distillation. (It is distilled at a bath temperature of 135°C. under 2 mm. pressure of mercury).

Analysis:

Calculated for $C_8H_{10}O_2$: C,69.54; H,7.30.

Found : C,69.22; H,7.21

IR (Nujol) $\nu$ cm$^{-1}$ : 1695 (C=O), 2550 - 2800 (OH).

N.M.R. $\delta$ ppm (CDCl$_3$): 1.4 - 2.2 (2H, multiplet, ≡C-CH-CH-CO-)

1.76 (3H, doublet, J=2.0, $\underline{CH_3}$-C≡C-), 1.20 (3H, doublet, J=4.5, ≡C-C(CH$_3$)-CH-CO-), 1.0 - 1.4 (1H, multiplet, ≡C-C(CH$_3$)-CH-CO-), 8.53 (1H, singlet, -COO$\underline{H}$),

EXAMPLE 12

3-Phenylethynyl-1-benzyloxycarbonylcyclopropane

Following the procedure of Example 1-(1), but replacing the methyl acrylate with 3.24 g. of benzyl acrylate, there is obtained 1.7 g. of the desired product boiling at 190°C. under 0.01 mm. pressure of mercury.

Analysis

Calculated for $C_{19}H_{16}O_2$: C,82.58; H,5.84

Found : C,82.38; H,5.75.

I.R. (liquid film) $\nu$ cm$^{-1}$: 2220 (C≡C), 1730 (C=O).

N.M.R. $\delta$ ppm (CDCl$_3$); 2.10 (2H, multiplet, =C-CH-CH-CO-), 7.30 (5H, multiplet, 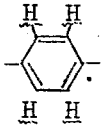), 1.40 (2H, multiplet, ), 5.17 (2H, singlet, ).

EXAMPLE 13

3-Phenyl-2-p-bromophenylethynyl-1-methoxycarbonylcyclopropane

In 100 ml. of tetrahydrofuran are dissolved 3.62 g. 3-(p-bromophenyl)-2-propynyltetrahydrothiophenium bromide and methyl cinnamate and the solution is cooled to 0° – 5°C. with stirring. To the mixture is added 0.48 g. of 50 percent sodium hydride. The mixture is stirred at that temperature for 30 minutes and further at room temperature for 1 hour. The reaction mixture is treated with the same procedure as in Example 1-(1). The pure desired product is obtained without distillation procedure as colorless oil.

Analysis:

Calculated for $C_{19}H_{15}O_2Br$: C,64.24; H,4.26; Br,22.50.

Found : C,64.10; H,4.31; Br,22.14.

I.R. (liquid film) $\nu$ cm$^{-1}$: 2220 (C≡C), 1735 (C=O).

N.M.R. $\delta$ ppm (CDCl$_3$); 2.8 (1H, multiplet, 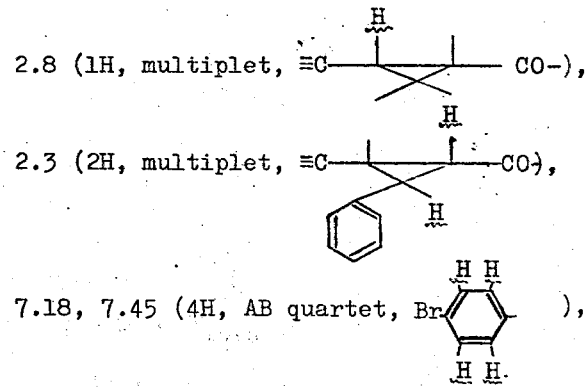), 2.3 (2H, multiplet, 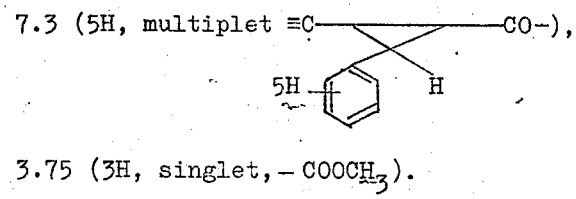), 7.18, 7.45 (4H, AB quartet, 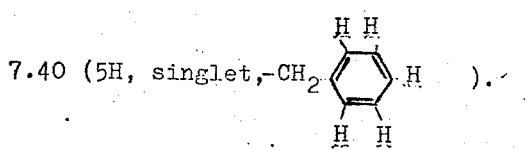), 7.3 (5H, multiplet 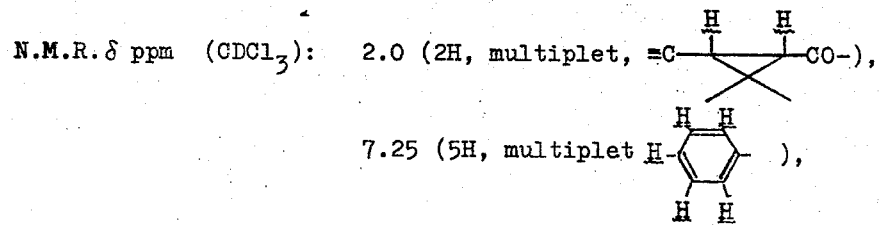), 3.75 (3H, singlet, –COOCH$_3$).

EXAMPLE 14

3,3-Dimethyl-2-phenylethynyl-1-ethoxycarbonylcyclopropane

Following the procedure of Example 1-(1), but replacing the methyl acrylate with 2.56 g. of ethyl β,β-dimethylacrylate, there is obtained without distillation procedure 0.2 g. of the pure desired product as colorless oil.

Analysis:

Calculated for $C_{16}H_{18}O_2$: C,79.31; H,7.49.

Found : C,79.10; H,7.35.

I.R. (liquid film) $\nu$ cm$^{-1}$: 2225 (C≡C), 1737 (C=O).

N.M.R. $\delta$ ppm (CDCl$_3$): 2.0 (2H, multiplet, ≡C—CO–), 7.25 (5H, multiplet H–), 1.3 (6H, singlet, ≡C—⟨CH₃⟩⟨CH₃⟩—CO—), 1.25 (3H, triplet, —COO—CH₂—CH₃), 4.07 (2H, quartet, —COO—CH₂CH₃),

EXAMPLE 15

3-Phenylethynyl-1,2-bis(methoxycarbonyl)cyclopropane

Following the procedure of Example 1-(1), but replacing the methyl acrylate with 2.88 g. of dimethyl fumarate, there is obtained without distillation procedure 0.5 g. of the pure desired product as colorless oil.

Analysis:

Calculated for $C_{15}H_{14}O_4$: C, 69.75; H, 5.46.

Found : C, 69.48; H, 5.37.

I.R. (liquid film) $\nu$ cm$^{-1}$ : 1753 (C=O)

N.M.R. (2H, multiplet, ≡C—⟨H,H⟩⟨⟩—CO—), 7.33 (5H, multiplet, 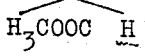 ), 3.78 (6H, singlet, —COOCH₃), 0.5 – 1.3 (1H, multiplet, ≡C—⟨⟩⟨H₃COOC,H⟩—CO—).

EXAMPLE 16

Following the procedure of Example 1, but replacing the 3-phenyl-2-propynyltetrahydrothiophenium bromide with 3-o-methylphenyl-2-propynyltetrahydrothiophenium bromide, 3-o-chlorophenyl-2-propynyltetrahydrothiophenium bromide, 3-o-methoxyphenyl-2-propynyltetrahydrothiophenium bromide, 3-m-methylphenyl-2-propynyltetrahydrothiophenium bromide, 3-m-tri-fluoromethylphenyl-2-propynyltetrahydrothiophenium bromide, 3-m-chlorophenyl-2-propynyltetrahydrothiophenium bromide, 3-m-bromophenyl-2-propynyltetrahydrothiophenium bromide, 3-m-methoxyphenyl-2-propynyltetrahydrothiophenium bromide, 3-p-methylphenyl-2-propynyltetrahydrothiophenium bromide, 3-p-trifluoromethylphenyl-2-propynyltetrahydrothiophenium bromide, 3-p-fluorophenyl-2-propynyltetrahydrothiophenium bromide, 3-p-chlorophenyl-2-propynyltetrahydrothiophenium bromide, 3-p-bromophenyl-2-propynyltetrahydrothiophenium bromide and 3-p-methoxyphenyl-2-propynyltetrahydrothiophenium bromide, respectively, there are obtained;

2-o-methylphenylethynyl-1-methoxycarbonylcyclopropane (oil), 2-o-chlorophenylethynyl-1-methoxycarbonylcyclopropane (oil), 2-o-methoxyphenylethynyl-1-methoxycarbonylcyclopropane (oil), 2-m-methylphenylethynyl-1-methoxycarbonylcyclopropane (oil), 2-m-trifluoromethylphenylethynyl-1-methoxycarbonylcyclopropane (oil), 2-m-chlorophenylethynyl-1-methoxycarbonylcyclopropane (oil), 2-m-bromophenylethynyl-1-methoxycarbonylcyclopropane (oil), 2-m-methoxyphenylethynyl-1-methoxycarbonylcyclopropane (oil), 2-p-methylphenylethynyl-1-methoxycarbonylcyclopropane (b.p. 112° – 113°C./10$^{-3}$mmHg.), 2-p-trifluoromethynylethynyl-1-methoxycarbonylcyclopropane (oil), 2-p-fluorophenylethynyl-1-methoxycarbonylcyclopropane (m.p. 55° – 57°C), 2-p-chlorophenylethynyl-1-methoxycarbonylcyclopropane (oil), 2-p-bromophenylethynyl-1-methoxycarbonylcyclopropane (m.p. 57° – 59°C.) and 2-p-methoxyphenylethynyl-1-methoxycarbonylcyclopropane (oil), respectively.

EXAMPLE 17

2-Phenylethynyl-1-carboxycyclopropane 46.7 g. 2-phenyl-1-methoxycarbonylcyclopropane and 30 g. of potassium hydroxide and dissolved in a mixture of 120 ml. of water and 480 ml. of methanol and the resulting solution is stirred at room temperature for 15 hours. The reaction mixture is made acidic (below pH 1.0) by addition of hydrochloric acid and extracted with ethyl acetate. The extract is washed with saturated aqueous sodium chloride and dried over anhydrous sodium sulfate. The solvent is distilled off and the residue is recrystallized from n-heptane to give 25.1 g. of the desired product melting at 89° – 90°C. The yield is 57.6 percent.

EXAMPLE 18

Following the procedure of Example 17, but replacing the 2-phenylethynyl-1-methoxycarbonylcyclopropane with 2-o-methylphenylethynyl-1-methoxycarbonylcyclopropane, 2-o-chlorophenylethynyl-1-methoxycarbonylcyclopropane, 2-o-methoxyphenyethynyl-1-methoxycarbonylcyclopropane, 2-m-methylphenylethynyl-1-methoxycarbonylcyclopropane, 2-m-trifluoromethylphenylethynyl-1-methoxycarbonylcyclopropane, 2-m-chlorophenylethynyl-1-methoxycarbonylcyclopropane, 2-m-bromophenylethynyl-1-methoxycarbonylcyclopropane, 2-m-methoxyphenylethynyl-1-methoxycarbonylcyclopropane, 2-p-methylphenylethynyl-1-methoxycarbonylcyclopropane, 2-p-trifluoromethylphenylethynyl-1-methoxycarbonylcyclopropane, 2-p-fluorphenylethynyl-1-methoxycarbonylcyclopropane, 2-p-chlorophenylethynyl-1-methoxycarbonylcyclopropane, 2-p-bromophenylethynyl-1-methoxycarbonylcyclopropane and 2-p-methoxyphenylethynyl-1-methoxycarbonylcyclopropane, respectively, there are obtained, 2-o-methylphenylethynyl-1-carboxycyclopropane (m.p. 87° – 89°C.), 2-o-chlorophenylethynyl-1-carboxycyclopropane (m.p. 96.5° – 98.0°C), 2-o-methoxyphenylethynyl-1-carboxycyclopropane (m.p. 106° – 108°C.), 2-m-methylphenylethynyl-1-carboxycyclopropane (m.p. 100° – 102°C.), 2-m-trifluoromethylphenylethynyl-1-carboxycyclopropane (m.p. 91°– 93°C.), 2-m-chlorophenylethynyl-1-carboxycyclopropane (m.p. 109° – 112°C.), 2-m-bromophenylethynyl-1-carboxycyclopropane (m.p. 116° – 117.5°C.), 2-m-methoxyphenylethynyl-1-carboxycyclopropane (oil), 2-p-methylphenylethynyl-1-carboxycyclopropane (m.p. 105° – 106°C.), 2-p-trifluoromethylphenylethynyl-1-carboxycyclopropane (m.p. 155°– 158°C.), 2-p-fluorophenylethynyl-1-carboxycyclopropane (m.p. 99° – 100°C.), 2-p-chlorophenylethynyl-1-carboxycyclopropane (m.p. 114° – 115°C.), 2-p-bromophenylethynyl-1-carboxycyclopropane (m.p. 122° – 124°C.) and 2-p-methoxyphenylethynyl-1-carboxycyclopropane (m.p. 125° – 128°C.), respectively.

EXAMPLE 19

2-Phenylethynyl-1-carboxycyclopropane sodium salt

In 10 ml. of absolute ethanol is dissolved 4.14 g. of 2-phenylethynyl-1-carboxycyclopropane. The solution is added dropwise to a sodium ethoxide solution prepared from 0.51 g. of sodium and 50.0 ml. of absolute ethanol under cooling with ice. After stirring for 2 hours the white precipitates formed are separated by filtration, washed and dried. The crude product is recrystallized from ethanolether to give 2.9 g. of the desired product melting at 273° – 276°C. (with decomposition). The yield is 63 percent.

What is claimed is:

1. A compound having the formula $$R_1-C \equiv C-CH\diagdown_{\substack{C \\ R_2 \ R_3}}\diagup CH-COOR_4$$

wherein $R_1$ is a phenyl group of a phenyl group substituted with a trifluoromethyl, halogen, a lower alkyl, or a lower alkoxy group, $R_2$ and $R_3$ are the same or different and each represents a hydrogen atom or a phenyl group, and $R_4$ represents a hydrogen atom, a lower alkyl group or benzyl group, and an alkali metal, an alkaline earth metal or an aluminum salt thereof.

2. 2-Phenylethynyl-1-carboxycyclopropane of the formula of claim 1.

3. 2-Phenylethynyl-1-methoxycarbonylcyclopropane of the formula of claim 1.

4. 2-p-Bromophenylethynyl-1-methoxycarbonylcyclopropane of the formula of claim 1.

5. 3-Methyl-2-phenylethynyl-1-methoxycarbonylcyclopropane of the formula of claim 1.

6. 2-Phenylethynyl-1-ethoxycarbonylcyclopropane of the formula of claim 1.

7. 2-p-Bromophenylethynyl-1-carboxycyclopropane of the formula of claim 1.

8. 3Phenylethynyl-1-benzyloxycarbonylcyclopropane of the formula of claim 1.

9. 3-Phenyl-2-p-bromophenylethynyl-1-methoxycarbonylcyclopropane of the formula of claim 1.

10. 3,3-Dimethyl-2-phenylethynyl-1-ethoxycarbonylcyclopropane of the formula of claim 1.

11. 3-Phenylethynyl-1,2-bis(methoxycarbonyl)cyclopropane of the formula of claim 1.

12. 2-Phenylethynyl-1-carboxycyclopropane sodium salt of the formula of claim 1.

* * * * *